United States Patent
Hazard

(10) Patent No.: US 11,880,775 B1
(45) Date of Patent: Jan. 23, 2024

(54) ENTROPY-BASED TECHNIQUES FOR IMPROVED AUTOMATED SELECTION IN COMPUTER-BASED REASONING SYSTEMS

(71) Applicant: Diveplane Corporation, Raleigh, NC (US)

(72) Inventor: Christopher James Hazard, Durham, NC (US)

(73) Assignee: Diveplane Corporation, Raleigh, NC (US)

( * ) Notice: Subject to any disclaimer, the term of this patent is extended or adjusted under 35 U.S.C. 154(b) by 1381 days.

(21) Appl. No.: 16/000,043

(22) Filed: Jun. 5, 2018

(51) Int. Cl.
| | |
|---|---|
| *G06N 5/022* | (2023.01) |
| *G05B 13/02* | (2006.01) |
| *G05B 13/04* | (2006.01) |
| *G06N 7/01* | (2023.01) |
| *G05B 17/02* | (2006.01) |

(52) U.S. Cl.
CPC ........... *G06N 5/022* (2013.01); *G05B 13/028* (2013.01); *G05B 13/04* (2013.01); *G06N 7/01* (2023.01); *G05B 17/02* (2013.01)

(58) Field of Classification Search
CPC ...... G06N 5/022; G06N 7/005; G05B 13/028; G05B 13/04; G05B 17/02
See application file for complete search history.

(56) References Cited

U.S. PATENT DOCUMENTS

| | | |
|---|---|---|
| 4,935,877 A | 6/1990 | Koza |
| 5,581,664 A | 12/1996 | Allen et al. |
| 6,282,527 B1 | 8/2001 | Gounares et al. |
| 6,741,972 B1 | 5/2004 | Girardi et al. |
| 7,873,587 B2 | 1/2011 | Baum |
| 9,489,635 B1 | 11/2016 | Zbu |
| 9,922,286 B1 | 3/2018 | Hazard |
| 10,459,444 B1 | 10/2019 | Kentley-Klay |
| 2001/0049595 A1 | 12/2001 | Plumer et al. |
| 2004/0019851 A1 | 1/2004 | Purvis et al. |
| 2005/0137992 A1 | 6/2005 | Polak |
| 2006/0195204 A1 | 8/2006 | Bonabeau et al. |
| 2008/0153098 A1 | 6/2008 | Rimm et al. |
| 2008/0307399 A1 | 12/2008 | Zbou et al. |
| 2009/0006299 A1 | 1/2009 | Baum |

(Continued)

FOREIGN PATENT DOCUMENTS

| | | |
|---|---|---|
| WO | WO2017057528 | 4/2017 |
| WO | WO2017189859 | 11/2017 |

OTHER PUBLICATIONS

Abdi, "Cardinality Optimization Problems", The University of Birmingham, PhD Dissertation, May 2013, 197 pages.

(Continued)

*Primary Examiner* — Tejal Gami
(74) *Attorney, Agent, or Firm* — Dority & Manning, P.A.

(57) ABSTRACT

Techniques for improved automated selection in computer-based reasoning systems are presented. The techniques include receiving context data for operation of a system, determining two or more candidate actions to take, each from a different computer-based reasoning model, and determining the surprisal of each. The surprisals are then compared and, in some embodiments, the one with the lowest surprisal is chosen. In some embodiments, this chosen action is performed on the system. In some embodiments, the chosen action is passed up a control hierarchy for consideration along with entropy and other factors, and the action chosen at that level is performed on the controlled system.

19 Claims, 4 Drawing Sheets

(56) References Cited

U.S. PATENT DOCUMENTS

| | | |
|---|---|---|
| 2009/0144704 A1 | 6/2009 | Niggemann et al. |
| 2010/0106603 A1 | 4/2010 | Dey et al. |
| 2010/0287507 A1 | 11/2010 | Paquette et al. |
| 2011/0060895 A1 | 3/2011 | Solomon |
| 2011/0161264 A1 | 6/2011 | Cantin |
| 2011/0225564 A1 | 9/2011 | Biswas et al. |
| 2013/0006901 A1 | 1/2013 | Cantin |
| 2013/0339365 A1 | 12/2013 | Balasubramanian et al. |
| 2016/0055427 A1 | 2/2016 | Adiaoute |
| 2017/0010106 A1 | 1/2017 | Shashua et al. |
| 2017/0012772 A1 | 1/2017 | Mueller |
| 2017/0053211 A1 | 2/2017 | Heo et al. |
| 2017/0091645 A1 | 3/2017 | Matus |
| 2017/0161640 A1 | 6/2017 | Shamir |
| 2017/0236060 A1 | 8/2017 | Ignatyev |
| 2018/0072323 A1 | 3/2018 | Gordon et al. |
| 2018/0089563 A1 | 3/2018 | Redding et al. |
| 2018/0235649 A1 | 8/2018 | Elkadi |
| 2018/0336018 A1 | 11/2018 | Lu et al. |

OTHER PUBLICATIONS

Aboulnaga, "Generating Synthetic Complex-structured XML Data", Proceedings of the Fourth International Workshop on the Web and Databases, WebDB 2001, Santa Barbara, California, USA, May 24-25, 2001, 6 pages.

Abramson, "The Expected-Outcome Model of Two-Player Games", Phd Thesis, Columbia University, New York, New York, 1987, 125 pages.

Abuelaish et al., "Analysis and Modelling of Groundwater Salinity Dynamics in the Gaza Strip", Cuadernos Geograficos, vol. 57, Issue 2, pp. 72-91.

Agarwal et al., "Nearest-Neighbor Searching Under Uncertainty II", ACM Transactions on Algorithms, vol. 13, Issue 1, Article 3, 2016, 25 pages.

Aggarwal et al., "On the Surprising Behavior of Distance Metrics in High Dimensional Space", International Conference on Database Theory, London, United Kingdom, Jan. 4-6, 2001, pp. 420-434.

Akaike, "Information Theory and an Extension of the Maximum Likelihood Principle", Proceedings of the 2nd International Symposium on Information Theory, Sep. 2-8, 1971, Tsahkadsor, Armenia, pp. 267-281.

Alhaija, "Augmented Reality Meets Computer Vision: Efficient Data Generation for Urban Driving Scenes", arXiv:1708.01566v1, Aug. 4, 2017, 12 pages.

Alpaydin, "Machine Learning: The New AI", MIT Press, Cambridge, Massachusetts, 2016, 225 pages.

Alpaydin, "Voting Over Multiple Condensed Nearest Neighbor", Artificial Intelligence Review, vol. 11, 1997, pp. 115-132.

Altman, "An Introduction to Kernel and Nearest-Neighbor Nonparametric Regression", The American Statistician, vol. 46, Issue 3, 1992, pp. 175-185.

Anderson, "Synthetic data generation for the internet of things," 2014 IEEE International Conference on Big Data (Big Data), Washington, DC, 2014, pp. 171-176.

Archer et al., "Empirical Characterization of Random Forest Variable Importance Measures", Computational Statistics & Data Analysis, vol. 52, 2008, pp. 2249-2260.

Beyer et al., "When is 'Nearest Neighbor' Meaningful?" International Conference on Database Theory, Springer, Jan. 10-12, 1999, Jerusalem, Israel, pp. 217-235.

Bull, Haploid-Diploid Evolutionary Algorithms: The Baldwin Effect and Recombination Nature's Way, Artificial Intelligence and Simulation of Behaviour Convention, Apr. 19-21, 2017, Bath, United Kingdom, pp. 91-94.

Cano et al., "Evolutionary Stratified Training Set Selection for Extracting Classification Rules with Tradeoff Precision-Interpretability" Data and Knowledge Engineering, vol. 60, 2007, pp. 90-108.

Chawla, "SMOTE: Synthetic Minority Over-sampling Technique", arXiv:1106.1813v1, Jun. 9, 2011, 37 pages.

Chen, "DropoutSeer: Visualizing Learning Patterns in Massive Open Online Courses for Dropout Reasoning and Prediction", 2016 IEEE Conference on Visual Analytics Science and Technology (VAST), Oct. 23-28, 2016, Baltimore, Maryland, USA, 10 pages.

Chomboon et al., An Empirical Study of Distance Metrics for k-Nearest Neighbor Algorithm, 3rd International Conference on Industrial Application Engineering, Kitakyushu, Japan, Mar. 28-31, 2015, pp. 280-285.

Colakoglu, "A Generalization of the Minkowski Distance and a New Definition of the Ellipse", arXiv:1903.09657v1, Mar. 2, 2019, 18 pages.

Dernoncourt, "MoocViz: A Large Scale, Open Access, Collaborative, Data Analytics Platform for MOOCs", NIPS 2013 Education Workshop, Nov. 1, 2013, Lake Tahoe, Utah, USA, 8 pages.

Ding, "Generating Synthetic Data for Neural Keyword-to-Question Models", arXiv:1807.05324v1, Jul. 18, 2018, 12 pages.

Dwork et al., "The Algorithmic Foundations of Differential Privacy", Foundations and Trends in Theoretical Computer Science, vol. 9, Nos. 3-4, 2014, pp. 211-407.

Efros et al., "Texture Synthesis by Non-Parametric Sampling", International Conference on Computer Vision, Sep. 20-25, 1999, Corfu, Greece, 6 pages.

Fathony, "Discrete Wasserstein Generative Adversarial Networks (DWGAN)", OpenReview.net, Feb. 18, 2018, 20 pages.

Ganegedara et al., "Self Organizing Map Based Region of Interest Labelling for Automated Defect Identification in Large Sewer Pipe Image Collections", IEEE World Congress on Computational Intelligence, Jun. 10-15, 2012, Brisbane, Australia, 8 pages.

Gao et al., "Efficient Estimation of Mutual Information for Strongly Dependent Variables", 18th International Conference on Artificial Intelligence and Statistics, San Diego, California, May 9-12, 2015, pp. 277-286.

Gehr et al., "AI2: Safety and Robustness Certification of Neural Networks with Abstract Interpretation", 39th IEEE Symposium on Security and Privacy, San Francisco, California, May 21-23, 2018, 16 pages.

Gemmeke et al., "Using Sparse Representations for Missing Data Imputation in Noise Robust Speech Recognition", European Signal Processing Conference, Lausanne, Switzerland, Aug. 25-29, 2008, 5 pages.

Ghosh, "Inferential Privacy Guarantees for Differentially Private Mechanisms", arXiv:.1603:01508v1, Mar. 4. 2016, 31 pages.

Goodfellow et al., "Deep Learning", 2016, 800 pages.

Google AI Blog, "The What-If Tool: Code-Free Probing of Machine Learning Models", Sep. 11, 2018, https://pair-code,github.io/what-if-tool, retrieved on Mar. 14, 2019, 5 pages.

Gottlieb et al., "Near-Optimal Sample Compression for Nearest Neighbors", Advances in Neural Information Processing Systems, Montreal, Canada, Dec. 8-13, 2014, 9 pages.

Gray, "Quickly Generating Billion-Record Synthetic Databases", SIGMOD '94: Proceedings of the 1994 ACM SIGMOD international conference on Management of data, May 1994, Minneapolis, Minnesota, USA, 29 pages.

Hastie et al., "The Elements of Statistical Learning", 2001, 764 pages.

Hazard et al., "Natively Interpretable Machine Learning and Artificial Intelligence: Preliminary Results and Future Directions", arXiv:1901v1, Jan. 2, 2019, 15 pages.

Hinneburg et al., "What is the Nearest Neighbor in High Dimensional Spaces?", 26th International Conference on Very Large Databases, Cairo, Egypt, Sep. 10-14, 2000, pp. 506-515.

Hmeidi et al., "Performance of KNN and SVM Classifiers on Full Word Arabic Articles", Advanced Engineering Informatics, vol. 22, Issue 1, 2008, pp. 106-111.

Hoag "A Parallel General-Purpose Synthetic Data Generator", ACM SIGMOID Record, vol. 6, Issue 1, Mar. 2007, 6 pages.

Houle et al., "Can Shared-Neighbor Distances Defeat the Curse of Dimensionality?", International Conference on Scientific and Statistical Database Management, Heidelberg, Germany, Jun. 31-Jul. 2, 2010, 18 pages.

(56) References Cited

OTHER PUBLICATIONS

Imbalanced-learn, "SMOTE", 2016-2017, https://imbalanced-learn.readthedocs.io/en/stable/generated/imblearn.over_sampling.SMOTE.html, retrieved on Aug. 11, 2020, 6 pages.
Indyk et al., "Approximate Nearest Neighbors: Towards Removing the Curse of Dimensionality", Procedures of the 30th ACM Symposium on Theory of Computing, Dallas, Texas, May 23-26, 1998, pp. 604-613.
International Search Report and Written Opinion for PCT/US2018/047118, dated Dec. 3, 2018, 9 pages.
International Search Report and Written Opinion for PCT/US2019/026502, dated Jul. 24, 2019, 16 pages.
International Search Report and Written Opinion for PCT/US2019/066321, dated Mar. 19, 2020, 17 pages.
Internet Archive, "System Verilog distribution Constraint—Verification Guide", Aug. 6, 2018, http://web.archive.org/web/20180806225430/https://www.verificationguide.com/p/systemverilog-distribution-constraint.html, retrieved on Mar. 3, 2020, 4 pages.
Internet Archive, "System Verilog Testbench Automation Tutorial", Nov. 17, 2016, https://web.archive.org/web/20161117153225/http://www.doulos.com/knowhow/sysverilog/tutorial/constraints/, retrieved on Mar. 3, 2020, 6 pages.
Kittler, "Feature Selection and Extraction", Handbook of Pattern Recognition and Image Processing, Jan. 1986, Chapter 3, pp. 115-132.
Kohavi et al., "Wrappers for Feature Subset Selection", Artificial Intelligence, vol. 97, Issues 1-2, Dec. 1997, pp. 273-323.
Kontorovich et al., "Nearest-Neighbor Sample Compression: Efficiency, Consistency, Infinite Dimensions", Advances in Neural Information Processing Systems, 2017, pp. 1573-1583.
Kulkarni et al., "Hierarchical Deep Reinforcement Learning: Integrating Temporal Abstraction and Intrinsic Motivation", arXiv:1604.06057v2, May 31, 2016, 14 pages.
Kuramochi et al., "Gene Classification using Expression Profiles: A Feasibility Study", Technical Report TR 01-029, Department of Computer Science and Engineering, University of Minnesota, Jul. 23, 2001, 18 pages.
Kushilevitz et al., "Efficient Search for Approximate Nearest Neighbor in High Dimensional Spaces", Society for Industrial and Applied Mathematics Journal Computing, vol. 30, No. 2, pp. 457-474.
Leinster et al., "Maximizing Diversity in Biology and Beyond", Entropy, vol. 18, Issue 3, 2016, 23 pages.
Liao et al., "Similarity Measures for Retrieval in Case-Based Reasoning Systems", Applied Artificial Intelligence, vol. 12, 1998, pp. 267-288.
Lin et al., "Why Does Deep and Cheap Learning Work So Well?" Journal of Statistical Physics, vol. 168, 2017, pp. 1223-1247.
Lin, "Development of a Synthetic Data Set Generator for Building and Testing Information Discovery Systems", Proceedings of the Third International Conference on Information Technology: New Generations, Nevada, USA, Apr. 10-12, 2016, Las Vegas, Nevada, USA, 6 pages.
Lukaszyk, "A New Concept of Probability Metric and its Applications in Approximation of Scattered. Data Sets", Computational Mechanics, vol. 33, 2004, pp. 299-304.
Lukaszyk, "Probability Metric, Examples of Approximation Applications in Experimental Mechanics", PhD Thesis, Cracow University of Technology, 2003, 149 pages.
Mann et al., "On a Test of Whether One or Two Random Variables is Stochastically Larger than the Other", The Annals of Mathematical Statistics, 1947, pp. 50-60.
Martino et al., "A Fast Universal Self-Tuned Sampler within Gibbs Sampling", Digital Signal Processing, vol. 47, 2015, pp. 68-83.
Mohri et al., Foundations of Machine Learning, 2012, 427 pages—uploaded as Part 1 and Part 2.
Montanez, "SDV: An Open Source Library for Synthetic Data Generation", Massachusetts Institute of Technology, Master's Thesis, Sep. 2018, 105 pages.
Negra, "Model of a Synthetic Wind Speed Time Series Generator", Wind Energy, Wiley Interscience, Sep. 6, 2007, 17 pages.
Nguyen et al., "NP-Hardness of $\ell_0$ Minimization Problems: Revision and Extension to the Non-Negative Setting", 13th International Conference on Sampling Theory and Applications, Jul. 8-12, 2019, Bordeaux, France, 4 pages.
Olson et al., "PMLB: A Large Benchmark Suite for Machine Learning Evaluation and Comparison", arXiv:1703.00512v1, Mar. 1, 2017, 14 pages.
Patki, "The Synthetic Data Vault: Generative Modeling for Relational Databases", Massachusetts Institute of Technology, Master's Thesis, Jun. 2016, 80 pages.
Patki, "The Synthetic Data Vault", 2016 IEEE International Conference on Data Science and Advanced Analytics (DSAA), Oct. 17-19, 2016, Montreal, QC, pp. 399-410.
Pedregosa et al., "Machine Learning in Python", Journal of Machine Learning Research, vol. 12, 2011, pp. 2825-2830.
Pei, "A Synthetic Data Generator for Clustering and Outlier Analysis", The University of Alberta, 2006, 33 pages.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner et al., "Evaluating Neural Network Explanation Methods Using Hybrid Documents and Morphosyntactic Agreement", Proceedings of the 56th Annual Meeting of the Association for Computational Linguistics (Long Papers), Melbourne, Australia, Jul. 15-20, 2018, pp. 340-350.
Prakosa "Generation of Synthetic but Visually Realistic Time Series of Cardiac Images Combining a Biophysical Model and Clinical Images" IEEE Transactions on Medical Imaging, vol. 32, No. 1, Jan. 2013, pp. 99-109.
Priyardarshini, "Wedagen: A synthetic web database generator", International Workshop of Internet Data Management (IDM'99), Sep. 2, 1999, Florence, IT, 24 pages.
Pudjijono, "Accurate Synthetic Generation of Realistic Personal Information" Advances in Knowledge Discovery and Data Mining, Pacific-Asia Conference on Knowledge Discovery and Data Mining, Apr. 27-30, 2009, Bangkok, Thailand, 12 pages.
Raikwal et al., "Performance Evaluation of SVM and K-Nearest Neighbor Algorithm Over Medical Data Set", International Journal of Computer Applications, vol. 50, No. 14, Jul. 2012, pp. 975-985.
Rao et al., "Cumulative Residual Entropy: A New Measure of Information", IEEE Transactions on Information Theory, vol. 50, Issue 6, 2004, pp. 1220-1228.
Reiter, "Using CART to Generate Partially Synthetic Public Use Microdata" Journal of Official Statistics, vol. 21, No. 3, 2005, pp. 441-462.
Ribeiro et al., "'Why Should I Trust You': Explaining the Predictions of Any Classifier", arXiv:1602.04938v3, Aug. 9, 2016, 10 pages.
Rosenberg et al., "Semi-Supervised Self-Training of Object Detection Models", IEEE Workshop on Applications of Computer Vision, 2005, 9 pages.
Schaul et al., "Universal Value Function Approximators", International Conference on Machine Learning, Lille, France, Jul. 6-11, 2015, 9 pages.
Schlabach et al., "FOX-GA: A Genetic Algorithm for Generating and ANalayzing Battlefield COurses of Action", 1999 MIT.
Schreck, "Towards An Automatic Predictive Question Formulation", Massachusetts Institute of Technology, Master's Thesis, Jun. 2016, 121 pages.
Schreck, "What would a data scientist ask? Automatically formulating and solving prediction problems", 2016 IEEE International Conference on Data Science and Advanced Analytics (DSAA), Oct. 17-19, 2016, Montreal, QC, pp. 440-451.
Schuh et al., "Improving the Performance of High-Dimensional KNN Retrieval Through Localized Dataspace Segmentation and Hybrid Indexing", Proceedings of the 17th East European Conference, Advances in Databases and Information Services, Genoa, Italy, Sep. 2013, pp. 344-357.
Schuh et al., "Mitigating the Curse of Dimensionality for Exact KNN Retrieval", Proceedings of the 26th International Florida

(56) References Cited

OTHER PUBLICATIONS

Artificial Intelligence Research Society Conference, St. Pete Beach, Florida, May 22-24, 2014, pp. 363-368.
Schwarz et al., "Estimating the Dimension of a Model", The Annals of Statistics, vol. 6, Issue 2, Mar. 1978, pp. 461-464.
Silver et al., "Mastering the Game of Go Without Human Knowledge", Nature, vol. 550, Oct. 19, 2017, pp. 354-359.
Skapura, "Building Neural Networks", 1996, p. 63.
Smith, "FeatureHub: Towards collaborative data science", 2017 IEEE International Conference on Data Science and Advanced Analytics (DSAA), Oct. 19-21, 2017, Tokyo, pp. 590-600.
Stephenson et al., "A Continuous Information Gain Measure to Find the Most Discriminatory Problems for AI Benchmarking", arxiv. org, arxiv.org/abs/1809.02904v2, retrieved on Aug. 21, 2019, 8 pages.
Stoppiglia et al., "Ranking a Random Feature for Variable and Feature Selection" Journal of Machine Learning Research, vol. 3, 2003, pp. 1399-1414.
Sun et al., "Fuzzy Modeling Employing Fuzzy Polyploidy Genetic Algorithms", Journal of Information Science and Engineering, Mar. 2002, vol. 18, No. 2, pp. 163-186.
Sun, "Learning Vine Copula Models For Synthetic Data Generation", arXiv:1812.01226v1, Dec. 4, 2018, 9 pages.
Surya et al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", 27th International Joint Conference on Artificial Intelligence, 2018, pp. 2703-2709.
Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification", 7th international Conference on Hybrid Artificial Intelligent Systems, Salamanca, Spain, Mar. 28-30, 2012, 38 pages.
Tran "Dist-GAN: An Improved GAN Using Distance Constraints", arXiv:1803.08887V3, Dec. 15, 2018, 20 pages.
Trautmann et al., "On the Distribution of the Desirability Index using Harrington's Desirability Function", Metrika, vol. 63, Issue 2, Apr. 2006, pp. 207-213.
Triguero et al., "Self-Labeled Techniques for Semi-Supervised Learning: Taxonomy, Software and Empirical Study", Knowledge and Information Systems, vol. 42, Issue 2, 2015, pp. 245-284.
Tuomisto, "A Consistent Terminology for Quantifying Species Diversity? Yes, It Does Exist" Oecologia, vol. 164, 2010, pp. 853-860.
Vacek et al., "Using Case-Based Reasoning for Autonomous Vehicle Guidance", International Conference on Intelligent Robots and Systems, San Diego, California, Oct. 29-Nov. 2, 2007, 5 pages.
Verleysen et al., "The Curse of Dimensionality in Data Mining and Time Series Prediction" International Work-Conference on Artificial Neural Networks, Barcelona, Spain, Jun. 8-10, 2005, pp. 758-770.
Viera, "Generating Synthetic Sequential Data using GANs", Medium: Toward AI, Jun. 29, 2020, 31 pages.
Wachter et al., "Counterfactual Explanations Without Opening the Black Box: Automated Decisions and the GDPR", Harvard Journal of Law and Technology, vol. 31, No. 2, Spring 2018, 47 pages.
Wang et al., "Falling Rule Lists" 18th International Conference on Artificial Intelligence and Statistics, San Diego, California, May 9-12, 2015, 10 pages.
Wei et al., "An Operation-Time Simulation Framework for UAV Swarm Configuration and Mission Planning", 2013.
Weselkowski et al., "TraDE: Training Device Selection via Multi-Objective Optimization", IEEE 2014.
Wu, "The Synthetic Student: A Machine Learning Model to Simulate MOOC Data", Massachusetts Institute of Technology, Master's Thesis, May 2015, 103 pages.
Xiao, "Towards Automatically Linking Data Elements", Massachusetts Institute of Technology, Master's Thesis, Jun. 2017, 92 pages.
Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.
Zhao et al., "Semi-Supervised Multi-Label Learning with Incomplete Labels", 24th International Joint Conference on Artificial Intelligence, Buenos Aires, Argentina, Jul. 25-31, 2015, pp. 4062-4068.

ENTROPY-BASED TECHNIQUES FOR IMPROVED AUTOMATED SELECTION IN COMPUTER-BASED REASONING SYSTEMS

FIELD OF THE INVENTION

The techniques herein are generally related to computer-based reasoning models and their control of systems. The techniques are more specifically related to entropy-based techniques for improved automated selection in computer-based reasoning systems.

BACKGROUND

One of the difficulties in using computer-based reasoning systems is creating a computer-based reasoning model that is appropriate for the particular contexts in which it will be used. For example, a computer-based reasoning system is being used to control a vehicle. The computer-based reasoning may have been trained in a certain set of contexts, such as during sunny days on highways. Another computer-based reasoning system may have been trained on a different set of contexts, such as rainy days on highways. Yet another may have been trained on snowy days on highways. Each of these computer-based reasoning systems may be useful for controlling a vehicle in the particular context in which it was trained. Situations will arise, however, when the context in which the vehicle is operating changes. None of the computer-based reasoning systems trained for specific contexts would be appropriate in all of the circumstances, or as the circumstances change. As such, the choice of any one of the computer-based reasoning models to control the system may produce poor results in many contexts.

Techniques herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims may serve as a summary of the invention.

DETAILED DESCRIPTION

Figure 1:
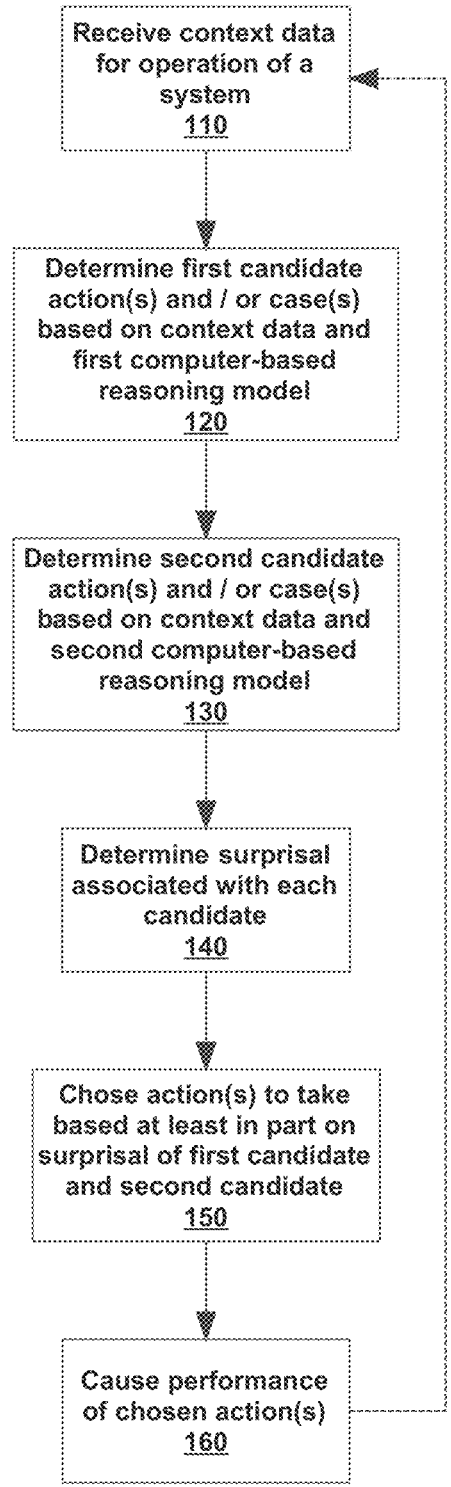
FIG. 1 depicts processes for improved automated selection in computer-based reasoning systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

As discussed above, one of the most difficult parts of using computer-based reasoning systems to control real-world systems is that a particular computer-based reasoning model may be trained for and appropriate in one circumstance and another may be appropriate in a different circumstance. For example, a first computer-based reasoning model for controlling a car may have been trained primarily on rainy days and a second computer-based reasoning model may have been trained primarily on sunny days. If one were to use the first computer-based reasoning model to control a vehicle on a sunny day, it would not perform as well as the second model, and vice-versa. Combining the two models may be one solution to the issue, but as you combine models, the resultant model will continue to grow in size, until the point where it would not be efficient (e.g., computationally) to use. Similar to the example above, one model may be trained for driving on a highway in the rain, another for driving on a highway in the snow, another for driving on a highway on a sunny day, and yet another for each of those circumstances in the dark or at night. Additional models may also be trained for surface roads in each of those circumstances. Combining all of these models together would result in making a combined model containing the data of numerous (e.g., twelve) different models.

Techniques herein address these issues by determining, in any context, what action would be taken by multiple, available computer-based reasoning models. The surprisal of the chosen actions are then determined, and, in some embodiments, the least "surprising" of those action is chosen. In some embodiments, the least surprising action is the one with the lowest surprisal. Calculating surprisal is discussed extensively elsewhere herein. In some embodiments, the actions chosen may be those with the highest surprisal, and/or other factors may be used to choose the actions.

Looking at the discussed issues with computer-based reasoning systems another way, one of the hardest parts of using computer-based reasoning systems is simultaneously obtaining sufficient breadth of training data while reducing model size, as those two goals are often at odds. The need for broad coverage pushes the size of sets of data elements in the computer-based reasoning model higher. Stated another way, training data should have broad coverage (e.g., many data elements) in order for it to be useful later in control of a system using the computer-based reasoning system. As such, trainers need to cover a wide range of contexts in order to ensure that the needed coverage is obtained. Collecting data for this broad coverage causes the size of the sets of data elements to increase. Having such large amounts of data can be useful for providing choice of actions to take in many contexts, but has downsides. Large sets of data elements take significant memory to store and incur significant processing costs when later finding matching context-action pairs. As such, it can be useful to have multiple computer-based reasoning models to choose from, where each is smaller, and directed to more specific, different contexts.

In some embodiments, the surprisal of the candidate actions can be based on the information gain or surprisal of each as compared to the other candidate actions. For example, suppose five driving models have been trained by different users in different circumstances, where the actions or labels include the angle of the steering wheel, the pressure on the brake, and the pressure on the throttle. The models are then run simultaneously on a vehicle while driving on a course to see how they would behave. The actions determined for each of the models in the circumstance can be compared relative to each other with regard to information gain. A voting-like mechanism for safety critical systems can include taking the action with the lowest information gain, that is, the one most like the others. Given that information gain is a universal measure, it may not matter what data types the actions are as long as there are supporting distance or similarity measures.

In some embodiments, information gain can be applied to compare the labels, actions, or answers that one model gives, relative to another model. For example, candidate actions to perform can be determined for each of multiple computer-based reasoning models. The surprisal (or information gain) of each candidate action is determined. The surprisal of each action can be the amount of information that the chosen data element provides to its corresponding computer-based reasoning model, relative either to the context, the action, or the context and action taken together. Techniques for determining surprisal are discussed extensively elsewhere herein. The action that provides the least information to its corresponding computer-based reasoning model may be the least surprising, and therefore may be chosen because it is the least surprising action as compared to the actions suggested by other models. This choice of model may be made solely based on the surprisal, or the model may be chosen based on the surprisal and other factors. For example, in some embodiments, the surprisal of the model may be "passed up" a decision structure (hierarchy, e.g.) that will take that surprisal into account as well as other factors, such as the model's actions or labels for a given context and/or their reported entropy.

In other embodiments, labels or features can be used to split a training model into multiple models, with each model reacting to or labeling a given feature vector or context and the one with the lowest information gain is selected. For example, consider a driving model trained on clear sunny days, another on rainy days, and another on slick icy surfaces. As described elsewhere herein, the self-driving car's software could select the action from the model that reports the lowest information gain from seeing the current feature vector, context, or situation. If the self-driving car is driving on an icy surface, the icy surface model may report the lowest information gain and drive the car safely, but as the car drives into a parking garage, the rainy-day model may report the lowest information gain to navigate the puddles of melted snow and ice, and the car may select its actions. As the self-driving car goes up a level and the concrete becomes dry, the sunny day model may report the lowest information gain and the car may select its actions.

Models may also be broken into multiple models that each contain some subset of the data, either by feature or label, set of features and/or labels, or by human editing or selection. This separation may be performed automatically based on the data, and each model has an attribute which is the label or labels that all the cases contained within the model would have. Information gain can be measured by adding one or more feature vectors or contexts to each of the models, and the model with the lowest information gain is the most similar. The model or models with the lowest information gain can be used to assign the label to the feature vector or context; a k-nearest neighbors approach may be used for those models with the lowest entropy. Relatedly, the model or models with the highest information gain are the least like the feature vector or context. This method of splitting of models can be used in a wide variety of circumstances to learn, model, and label complex data sets such as time series data or those with significant noise, and on some problems with feature vector combinatorial explosion issues can be used to reduce feature vector size considerably by increasing the number of training cases.

In some embodiments, information gain can be applied to compare one trained model to another. Suppose Alicia has trained a model how to drive equally in both city and highway scenarios and was very careful everywhere; Bob has trained a model how to drive equally in both city and highway scenarios but was very aggressive on highway driving; and Carol has trained a model how to drive with almost all city scenarios and few highway scenarios. Starting from Alicia's model, all of the data points or cases of Bob's model may be added, and the information gain can be computed relative to Alicia's model by adding all of the points or cases from Bob's model all at once. Similarly, Carol's model may be added to Alicia's model and the information gain computed from the result relative to Alicia's base model. In this manner, the similarities of the models may be compared; depending on the exact trained data, it may be that Bob's model is more similar to Alicia's than Carol's because it has less information gain because they both have significant training on both city and highway, whereas Carol's is missing highway training. However, if Alicia's highway training was mostly during rush hour traffic and Bob's highway training only consisted of dangerous high-speed maneuvers, it may be the case that Carol's model is more similar to Alicia's model than Bob's because it has less information gain. In this manner, models may be directly compared as well as comparing any subset of a model(s); for example, only the portions of the models that are like city driving could be extracted from the three and compared. Many uses exist for finding similar training models, that is, those with low information gain relative to the data elements added, such as finding models that might work in similar situations, might behave similarly, make similar recommendations, or be preferable for similar users. Uses for finding dissimilar training models, that is, those with high information gain, include finding new approaches, finding novel models to use in new scenarios, and finding models that exhibit anomalies or are otherwise anomalous.

Information gain is also used in some embodiments to let a human know when to take over control from a system being controlled by a computer-based reasoning system because the model does not have sufficient training data. For example, when the action being taken is associated with high information gain or surprisal, that may indicate that the action being taken is not related to others in the model. The system may indicate such an occurrence to a human operator, and that human operator may then take action on the system. For example, referencing examples from above, a vehicle may be travelling in a situation in which it has not been trained, such as during a hail storm. The model (or submodel) with actions related to either rainy-day driving or icy-day driving may have the lowest surprisal, but that surprisal may still be above a certain threshold. As such, a human operator of the vehicle (either inside or outside the vehicle) may be signaled that the situation is surprising for the underlying model and offer the human operator the opportunity to take over control of the vehicle. In some embodiments, it may be that the system would require the human operator to take over the system. For example, in an embodiment where the system being controlled was an image labeling system, if the label being chosen had a surprisal above a certain threshold, then the system may indicate that high surprisal to a human operator and have the human operator either confirm the label or choose one or more labels for the image.

Processes for Entropy-Based Techniques for Improved Automated Selection in Computer Based Reasoning Systems As an overview, process 100 includes receiving context data for operation of a system. The system may be any system capable of being controlled by a computer-based reasoning model, including those discussed herein. Process 100 may include determining (120 and 130) candidate actions based on the context data and two or more computer-based reasoning models. A surprisal associated with each candidate action (or set of actions) can then be determined (140). The action(s) to take (among candidate actions) is then chosen 150, and performance of the candidate action(s) is caused (160) or passed up a hierarchy for further consideration (not depicted in FIG. 1).

Returning to the top of process 100, it begins by receiving 110 context data for the operation of a system. Receiving 110 context data may include receiving a set of features for the operation of a system. The context may include features (e.g., data) that represent the operation of the system. Numerous examples of systems and features that might be collected are discussed herein. For example, in the context of a self-driving vehicle, the context may include speed, vehicle weight, time to impact (assuming speed and direction) to various objects in the environments, etc. In some embodiments, receiving 110 context data may include receiving a set of cases (e.g., when the system is a case-based reasoning system) or an entire model. For example, the context may be a set of cases or model related to the operation of the system, and the may be received 110 for consideration.

A first candidate action for a first computer-based reasoning model is determined 120 based on the context data, and a second candidate action for a second computer-based reasoning model is determined 130 based on the context data. For example, in some embodiments, the context data will include a set of features related to the operation of a system. The determination of a candidate action is discussed extensively elsewhere herein. For example, in some embodiments, in a case-based reasoning system, determining a candidate action may include determining the case(s) with the nearest or closest context, and the chosen action would be the action associated with the "nearest" or "closest" context. Numerous embodiments of choosing the nearest or closest case in a case-based reasoning system are discussed elsewhere herein. In some embodiments, surprisal for the first candidate action is determined 120 in the same manner as determined 130 for the second candidate action, but each may also be determined in different manners. In some embodiments, each model may determine 120 or 130 multiple candidate actions, may return a case, or a set of cases. For example, each model may return the N actions with the closest contexts and/or cases associated with the N closest contexts. In some embodiments, each case may include a context-action pair.

The surprisal associated with each candidate action is determined 140. When multiple cases and/or actions are returned by each model, surprisal may be determined for each case and/or action. Determining surprisal is discussed extensively throughout herein. In some embodiments, the surprisal for a particular action (or set of actions and/or cases) is determined relative to the other candidate actions (or set of actions and/or cases). Determining surprisal may include comparing a particular candidate action (or set of actions and/or cases) against the other candidates (e.g., the first candidate action, the second candidate action, and any other candidate actions) in order to determine how much information that particular candidate action would provide to the set of candidate actions. Determining such surprisal may include determining a first PDMF for the set of candidate actions first without the particular candidate action (or set of actions and/or cases) and then a second PDMF with the particular candidate action (or set of actions and/or cases). As described elsewhere herein, the ratio of those two PDMFs could then be the surprisal for the particular candidate action. The process of determining surprisal for each of the PDMFs could be repeated for each candidate action in the set of candidate actions.

In some embodiments, the surprisal for each candidate action (or set of actions and/or cases) may be determined 140 with respect to the model from which the candidate action (or set of actions and/or cases) was determined. Various embodiments of determining surprisal in this manner are described elsewhere herein. For example, the surprisal for the candidate action (or set of actions and/or cases) may be the ratio of two PDMFs, one PDMF for the model with the candidate action (or set of actions and/or cases) and one PDMF for the model without the candidate action (or set of actions and/or cases). In some embodiments, the second PDMF may be calculated based on treating the model as an 'empty model' where the probability of every data element is the interpreted as the same or "even", instead of using existing data element probability densities. The surprisal may then be the ratio of (or a function of the ratio of) those two PDMFs. Further, the determining 140 the surprisal for each candidate action (with respect to its model) may include determining the ratio of surprisal of the contexts or context-action pair to the average surprisal for context-action pairs in the model. This might be considered a form of normalization. In some embodiments, using this normalized ratio may be beneficial when there is less training data for one scenario (model) as compared to others, allowing it to be valued highly (based on the normalization) or when model complexity is quite diverse among the models under consideration.

An action is chosen 150 from among the candidate actions (or sets of actions) based at least in part on the surprisals of each. In some embodiments, the candidate action (or set of actions) with the lowest surprisal may be chosen 150 because, for example, it may be the one that is most like the others. In some embodiments, the candidate action (or set of actions) with the highest surprisal may be chosen 150 because, for example, it is the least like the other candidate actions. In some embodiments, an explanation for the choice of the cases may be determined based on a set of cases related to the chosen 150 action(s). For example, cases nearby the chosen 150 action(s) may be used to generate an explanation of why the action(s) were chosen 150.

In some embodiments, other factors are also taken into account when choosing 150 from among the candidate actions (or sets of actions). For example, when using a hierarchical model, the parent/commander/higher up models (described elsewhere herein) may take into account the surprisal, context, and/or the conviction (surprisal ratio) of each of the candidates. As an example, in the space of drone control: a collision avoidance model may have very low entropy when operating in an open field (it won't collide with anything). While in the open field, the drone should be following the model (and therefore the candidate actions) that gives waypoint navigation. When the drone returns to an area with considerable collision possibilities, it should follow the collision avoidance model. In some embodiments, the system learns reasonable bounds of surprisal ratio (conviction) and how they influence which model to use. In some embodiments, surprisal ratio can be determined based on determining a ratio of context distance, action distance, and/or feature distance (where a feature may be a context and an action), divided by surprisal.

In some embodiments, the chosen 150 action (or set of actions) is performed 160 or caused 160 to be performed on a controlled system by a control system. Numerous examples are given herein regarding controlling system, such as those discussed with respect to FIG. 4. In some embodiments, not depicted in FIG. 1, the chosen action may be sent or "passed" up a control hierarchy (such as the control hierarchies discussed herein), and the next higher level in the control hierarchy may assess the chosen action for either performance or passing up to a yet higher level in the control hierarchy. For example, in some embodiments, once an action is chosen at a lowest level of a control hierarchy, the chosen action may be passed up to the next-higher level of the control hierarchy. That next-higher level of the control hierarchy may receive other actions from other lower-level entities, and choose among those actions (e.g., using the techniques herein). The choice among the actions may be made based on entropies alone, or entropy in connection with other factors, such as one or more contexts, surprisal ratio, entropy, entropy ratio, conviction, and/or the like. In some embodiments, that next-higher level may also determine its own chosen action using process 100, and compare that action to those received from lower-level entities. Further, that next-higher level control may pass the action it choses up further in the hierarchy, and that level may again assess among the candidate actions it has (e.g., using process 100), and so on until a top-level entity in the control hierarchy chooses the action to cause 160 performance of.

In some embodiments, the candidate actions are not what might traditionally be considered actions to be taken, but instead are identifiers (e.g. a "name" of the model) associated with the respective models. This may allow for evaluating the surprisal of one or more feature vectors even if an action is not provided by the model. Stated another way, when the context received 110 is a set of cases or a model, then determining the candidate actions may include determining an identifier for a model with the lowest surprisal. For example, using the "name" of the model as the action could be used to perform image classification with neural networks (where you have a model trained for each different thing). Consider an example of written number image recognition; you might have a model for 0, 1, 2, 3, etc., and then when you have a new number to classify, you compare the surprisal for each of the models for 0, 1, 2, 3, etc. and choose the model with the lowest surprisal, which will tell you the most likely digit (and you could use the ratios of entropy to the others to tell you how convicted it was that it was the correct choice). In some embodiments, the comparison of models such as that described above can be used to detect anomalies in models and/or to find the least (or most) anomalous model. In some embodiments, one of the models being compared may be decomposed into a set of cases that may be added to or evaluated with relation to the second model.

The techniques herein are useful to case-based reasoning systems (one type of computer-based reasoning) but are also useful for data and model reduction for machine learning and artificial intelligence systems (also types of computer-based reasoning systems). For those systems, training data can become excessive, and training and retraining the neural network can be time and computationally intensive. Allowing for selection among multiple computer-based reasoning models may reduce the size of the training sets for each candidate computer-based reasoning, which can be beneficial for reducing training data (among other benefits) while minimizing the loss of information in the training. One such embodiment of model selection from among a group of models is to combine several models into an averaged baseline model, then other models may be compared to the baseline. Another such embodiment of model selection is to compare each model against a set of other models individually, and then the entropy can be averaged from the comparisons.

Example Processes for Controlling Systems

Figure 4:
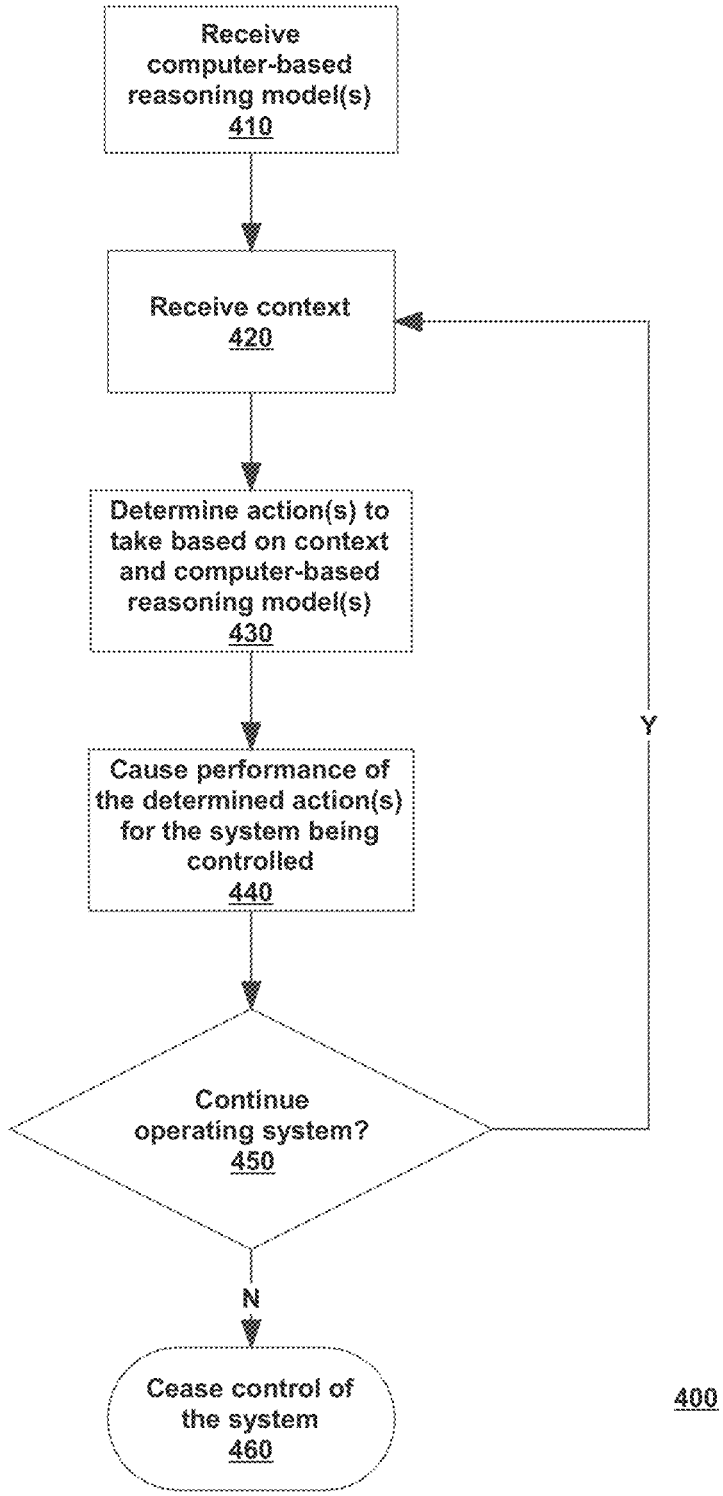
FIG. 4 depicts additional example processes for improved automated selection in computer-based reasoning systems.

FIG. 4 is a flow diagram depicting additional example processes for improved automated selection in computer-based reasoning systems. At a high level, process 400 proceeds by receiving 410 two or more computer-based reasoning models. These models may, for example, be related and may correspond to different areas of expertise in the control of a system (e.g., the example used herein of automated control systems for a self-driving car where one model was trained in part for driving on highways in sun, and another was trained for driving on side streets at night). Context for a system being controlled is received 420, and candidate action(s) are determined 430 based on the context and the computer-based reasoning models. As described elsewhere herein, the action(s) may be determined based on the process 100 (e.g., based on surprisal for each candidate action from each model). If the system is continuing to operate 450, then the process returns to receive 420 more context data. If not, then the control of the system ceases 460. Below are more details on control of various systems using the techniques herein.

As discussed herein the various processes 100 and 400. may run in parallel, in conjunction, together, or one process may be a subprocess of another. Further, any of the processes may run on the systems or hardware discussed herein. The features and steps of processes 100 and 400 could be used in combination and/or in different orders.

Controlling Self-Driving Vehicles

Returning to the top of the process 400, it begins by receiving 410 two or more computer-based reasoning models for controlling the system. The computer-based reasoning model may be received in any appropriate matter. It may be provided via a network 290, placed in a shared or accessible memory on either the analysis system 210 or control system 220, or in accessible storage, such as storage 230 or 240.

In some embodiments (not depicted in FIG. 4), an operational situation could be indicated for the system. The operational situation is related to context, but may be considered a higher level, and may not change (or change less frequently) during operation of the system. For example, in the context of control of a vehicle, the operational situation may be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the computer-based reasoning model is received before process 400 begins (not depicted in FIG. 4), and the process begins by receiving 420 the current context. For example, the computer-based reasoning model may already be loaded into a controller 220 and the process 400 begins by receiving 420 the current context for the system being controlled. In some embodiments, referring to FIG. 2, the current context for a system to be controlled (not depicted in FIG. 2) may be sent to control system 220, and control system 220 may receive 420 current context for the system.

Receiving 420 current context may include receiving the context data needed for a determination to be made using the computer-based reasoning model. For example, turning to the vehicular example, receiving 420 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

The control system then determined 430 an action to take based on the current context and the computer-based reasoning model. In some embodiments, the control system determines 430 the action to take using the process 100 of FIG. 1. Turning to the vehicular example, an action to take is determined 430 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest to the current context may be determined. In some embodiments, only the closest context-action pair is determined, and the action associated with that context-action pair is the determined 430 action. In some embodiments, multiple context-action pairs are determined 430. For example, the N "closest" context-action pairs may be determined 430, and either as part of the determining 430, or later as part of the causing 440 performance of the action, choices may be made on the action to take based on the N closest context-action pairs, where "distance" for between the current context can be measured using any appropriate technique, including use of Shannon Entropy, Renyi entropy, Hartley entropy, min entropy, Collision entropy, Renyi divergence, diversity index, Simpson index, Gini coefficient, Kullback-Leibler divergence, Fisher information, Jensen-Shannon divergence, Symmetrised divergence, 1-Kronecker delta, Euclidean distance, Minkowski distance, Damerau-Levenshtein distance, and/or any other distance measure, metric, psuedometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 4). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 4). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 430 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 4). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 430 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., $P*4$ in the next five thousand miles.

Performance of the determined 430 action is then caused 440. In some embodiments, causing 440 the action to be taken can be accomplished using process 100 of FIG. 1. Turning to the vehicular example, causing 440 performance of the action may include direct control of the vehicle and/or sending a message to a system, device, or interface that can control the vehicle. The action sent to control the vehicle may also be translated before it is used to control the vehicle. For example, the action determined 430 may be to navigate to a particular waypoint. In such an embodiment, causing 440 performance of the action may include sending the waypoint to a navigation system, and the navigation system may then, in turn, control the vehicle on a finer-grained level. In other embodiments, the determined 430 action may be to switch lanes, and that instruction may be sent to a control system that would enable the car to change the lane as directed. In yet other embodiments, the action determined 430 may be lower-level (e.g., accelerate or decelerate, turn 4° to the left, etc.), and causing 440 performance of the action may include sending the action to be performed to a control of the vehicle, or controlling the vehicle directly. In some embodiments, causing 440 performance of the action includes sending one or more messages for interpretation and/or display. In some embodiments, the causing 440 the action includes indicating the action to be taken at one or more levels of a control hierarchy for a vehicle. Examples of control hierarchies are given elsewhere herein.

Some embodiments include detecting anomalous actions taken or caused 440 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter fleet and the vehicle control rules associated with Bob, the vehicle control 220 may determine 430 what action to take for the helicopter based on the received 420 context. The vehicle control 220 may then cause the helicopter to perform the determined action, for example, by sending instructions related to the action to the appropriate controls in the helicopter. In the driving example, the vehicle control 220 may determine 430 what action to take based on the context of vehicle. The vehicle control may then cause 440 performance of the determined 430 action by the automobile by sending instructions to control elements on the vehicle.

If there are more 450 contexts for which to determine actions for the operation of the system, then the process 400 returns to receive 420 more contexts. Otherwise, process 400 ceases 460 control of the system. Turning to the vehicular example, as long as there is a continuation of operation of the vehicle using the vehicle control rules, the process 400 returns to receive 420 the subsequent current context for the vehicle. If the operational situation changes (e.g., the automobile is no longer on the stretch of road associated with the operational situation, a passenger indicates a new operational situation, etc.), then the process returns to determine the new operational situation. If the vehicle is no longer operating under vehicle control rules (e.g., it arrived at its destination, a passenger took over manual control, etc.), then the process 400 will discontinue 460 autonomous control of the vehicle.

Figure 2:
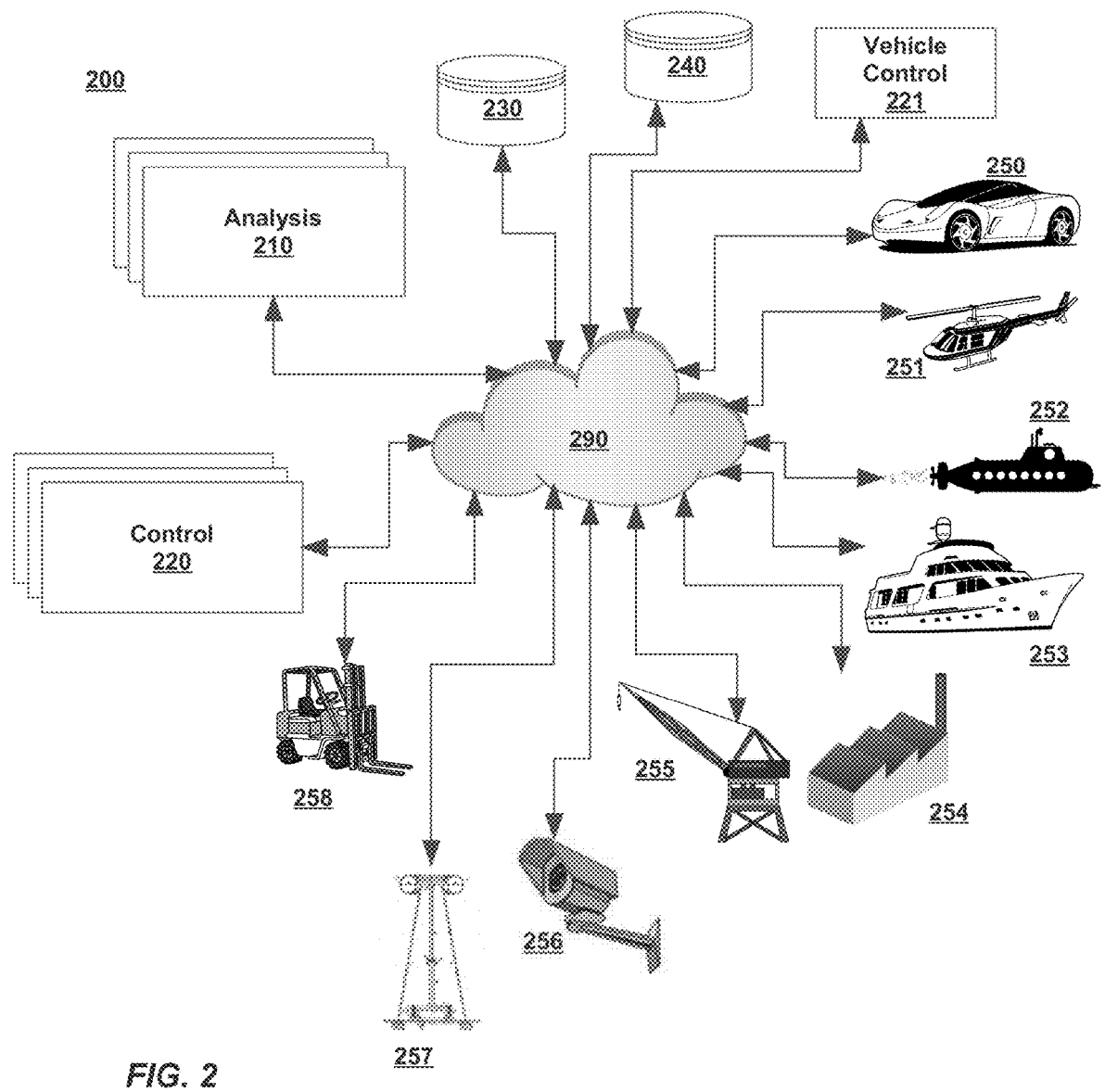
FIG. 2 depicts example systems for improved automated selection in computer-based reasoning systems.

Many of the examples discussed herein for vehicles discuss self-driving automobiles. As depicted in FIG. 2, numerous types of vehicles can be controlled. For example, a helicopter 251 or drone, a submarine 252, or boat or freight ship 253, or any other type of vehicle such as plane or drone (not depicted in FIG. 2), construction equipment, (not depicted in FIG. 2), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labeling

The process 100 and/or 400 may also be applied in the context of an image-labeling system. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the surprisal of the training data can be used to build an image-labeling computer-based reasoning system that balances the size of the computer-based reasoning model with the information that each additional image (or set of images) with associated labels provides. Once the image-labeling computer-based reasoning is trained, it can be used to label images in the future. For example, a new image may come in, the image-labeling computer-based reasoning may determine one or more labels for the image, and then the one or more labels may then be applied to the image. Thus, these images can be labeled automatically, saving the time and expense related to having experts label the images.

In some embodiments, process 100 may receive 110 an input image and determine 120 and 130 candidate labels for each of two or more image-labeling computer-based reasoning models. For each one or more candidate actions (e.g., labels to be applied), surprisal may be determined 140. This may be accomplished, in some embodiments, by determining a first and second PDMF for each, and determining surprisal based on the first and second PDMF. A determination may be made whether to select or choose 150 the one or more image labels to labels the images based at least in part on the determined surprisals. Labeling of the images may be caused 160, and the process may return to receive 110 more images to label. In some embodiments, the chosen labels may be passed up a control hierarchy and the process 100 may be repeated.

In some embodiments, labeling in an image-labeling system may be accomplished by process 400. Process 400 proceeds by receiving 410 two or more image-labeling computer-based reasoning models. The process proceeds by receiving 420 an image for labeling. The image-labeling computer-based reasoning model is then used to determine 430 labels for the input image (using, e.g., process 100). The image is then labeled 440 or caused to be labelled (see, e.g., causing 160 of process 100). If there are more 450 images to label, then the system returns to receive 420 more images and otherwise ceases 460. In such embodiments, the image-labeling computer-based reasoning model may be used to select labels based on which training image is "closest" to the incoming image. The label(s) associated with that image will then be selected to apply to the incoming image.

Manufacturing and Assembly

The process 100 and/or 400 may also be applied in the context of manufacturing and/or assembly. For example, entropy can be used to identify normal behavior versus anomalous behavior of such equipment. Using the techniques herein, a crane (e.g., crane 255 of FIG. 2), robot arm, or other actuator is attempting to "grab" something and its surprisal is too high, it can stop, sound an alarm, shutdown certain areas of the facility, and/or request for human assistance. Anomalous behavior that is detected via entropy among sensors and actuators can be used to detect when there is some sort breakdown, unusual wear and tear or mechanical or other malfunction, an unusual component or seed or crop, etc. It can also be used to find damaged equipment for repairs or buffing or other improvements for any robots that are searching and correcting defects in products or themselves (e.g., fixing a broken wire or smoothing out cuts made to the ends of a manufactured artifact made via an extrusion process). Entropy can also be used for cranes and other grabbing devices to find which cargo or items are closest matches to what is needed. Entropy can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help someone experienced while the apprentice is learning the job. Entropy can also inform what features or inputs to the robot are useful and which are not.

In some embodiments, process 100 may receive 110 a context for the operation of a manufacturing system and determine 120 and 130 candidate actions based on each of two or more manufacturing computer-based reasoning models. For each one or more candidate actions, surprisal may be determined 140. This may be accomplished, in some embodiments, by determining a first and second PDMF for each and determining surprisal based on the first and second PDMF. A determination may be made whether to select or choose 150 an action for the manufacturing system to take based at least in part on the determined surprisals. An action may be caused 160 based at least in part on the chosen action, and the process may return to receive 110 more contexts. In some embodiments, the chosen labels may be passed up a control hierarchy and the process 100 may be repeated and/or the higher-level control may choose based on the chosen 150 action passed up as well as other factors.

In some embodiments, manufacturing control may be accomplished by process 400. Process 400 proceeds by receiving 410 two or more manufacturing computer-based reasoning models. The process proceeds by receiving 420 a context for which a manufacturing action is needed. The manufacturing computer-based reasoning models are then used to determine 430 an action to take using a manufacturing control system (using, e.g., process 100). An action is then caused 440 in the manufacturing system (see, e.g., causing 160 of process 100). If there are more 450 contexts for which actions are needed, then the system returns to receive 420 more contexts and otherwise ceases 460. In such embodiments, the manufacturing computer-based reasoning models may be used to control what actions are taken by manufacturing equipment. These actions, in some embodiments, may be passed up a control hierarchy and an action to take chosen by the higher levels in the control hierarchy as described herein.

In some embodiments, the techniques herein may be used to find defects in manufactured items. For example, we may automatically perform numerous measurements of some known good component. Then, for every new component manufactured, the same set of measurements are performed. If the entropy of the new component's model is too high relative to the baseline "good" model, then it is sent back for reprocessing or human inspection.

Smart Voice Control

The process 100 and/or 400 may also be applied in the context of smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by entropy can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the entropy drops below a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, process 100 may receive 110 a context for the operation of a smart voice system and determine 120 and 130 candidate actions based on each of two or more smart voice computer-based reasoning models. For each one or more candidate actions, surprisal may be determined 140. This may be accomplished, in some embodiments, by determining a first and second PDMF for each and determining surprisal based on the first and second PDMF. A determination may be made whether to select or choose 150 an action for the smart voice system to take based at least in part on the determined surprisals. An action may be caused 160 based at least in part on the chosen action, and the process may return to receive 110 more contexts. In some embodiments, the chosen labels may be passed up a control hierarchy and the process 100 may be repeated.

In some embodiments, smart voice control may be accomplished by process 400. Process 400 proceeds by receiving 410 two or more smart voice computer-based reasoning models. The process proceeds by receiving 420 a context for which a smart voice control action is needed. The smart voice computer-based reasoning models are then used to determine 430 an action to take using a smart voice control system (using, e.g., process 100). An action is then caused 440 in the smart voice system (see, e.g., causing 160 of process 100). If there are more 450 contexts for which actions are needed, then the system returns to receive 420 more contexts and otherwise ceases 460. In such embodiments, the smart voice computer-based reasoning models may be used to control what actions are taken by smart voice control equipment. These actions, in some embodiments, may be passed up a control hierarchy and an action to take chosen by the higher levels in the control hierarchy as described herein.

Control of Federated Devices

The process 100 and/or 400 may also be applied in the context of federated devices in a system. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via goefence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, process 100 may receive 110 a context for the operation of a federated device system and determine 120 and 130 candidate actions based on each of two or more federated device computer-based reasoning models. For each one or more candidate actions, surprisal may be determined 140. This may be accomplished, in some embodiments, by determining a first and second PDMF for each and determining surprisal based on the first and second PDMF. A determination may be made whether to select or choose 150 an action for the federated device system to take based at least in part on the determined surprisals. An action may be caused 160 based at least in part on the chosen action, and the process may return to receive 110 more contexts. In some embodiments, the chosen labels may be passed up a control hierarchy and the process 100 may be repeated.

In some embodiments, federated device control may be accomplished by process 400. Process 400 proceeds by receiving 410 two or more federated device computer-based reasoning models. The process proceeds by receiving 420 a context for which a federated device control action is needed. The federated device computer-based reasoning models are then used to determine 430 an action to take using a federated device control system (using, e.g., process 100). An action is then caused 440 in the federated device system (see, e.g., causing 160 of process 100). If there are more 450 contexts for which actions are needed, then the system returns to receive 420 more contexts and otherwise ceases 460. In such embodiments, the federated device computer-based reasoning models may be used to control what actions are taken by federated device control equipment. These actions, in some embodiments, may be passed up a control hierarchy and an action to take chosen by the higher levels in the control hierarchy as described herein.

Control and Automation of Experiments

The process 100 and/or 400 may also be used in the context of control systems for laboratory experiments. For example, many lab experiments today, especially in the biological and life sciences, but also in materials science and others, yield combinatorial increases, in terms of numbers, of possibilities and results. The fields of design of experiment, as well as many combinatorial search and exploration techniques are currently combined with statistical analysis. However, entropy-based techniques such as those herein can be used to guide a search for knowledge, especially if combined with utility functions. Automated lab experiments may have actuators and may put different chemicals, samples, or parts in different combinations and put them under different circumstances. Using entropy to guide the machines enables them to hone in on learning how the system under study responds to different scenarios, and, for example, searching areas of greatest uncertainty. Conceptually speaking, when the surprisal is combined with a value function, especially in a multiplicative fashion, then the combination is a powerful information theoretic take on the classic exploration vs exploitation trade-offs that are made in search processes from artificial intelligence to science to engineering. Additionally, such a system can be made to automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. If the system has multiple kinds of sensors that have "costs" (e.g., monetary, time, computation, etc.) or cannot be all activated simultaneously, the feature entropies could be used to activate or deactivate the sensors to reduce costs or improve the distinguishability of the experimental results.

In some embodiments, process 100 may receive 110 a context for the operation of a laboratory experiment automation system and determine 120 and 130 candidate actions based on each of two or more laboratory experiment automation computer-based reasoning models. For each one or more candidate actions, surprisal may be determined 140. This may be accomplished, in some embodiments, by determining a first and second PDMF for each and determining surprisal based on the first and second PDMF. A determination may be made whether to select or choose 150 an action for the laboratory experiment automation system to take based at least in part on the determined surprisals. An action may be caused 160 based at least in part on the chosen action, and the process may return to receive 110 more contexts. In some embodiments, the chosen labels may be passed up a control hierarchy and the process 100 may be repeated.

In some embodiments, laboratory experiment control may be accomplished by process 400. Process 400 proceeds by receiving 410 two or more laboratory experiment automation computer-based reasoning models. The process proceeds by receiving 420 a context for which a laboratory experiment control action is needed. The laboratory experiment automation computer-based reasoning models are then used to determine 430 an action to take using a laboratory experiment control system (using, e.g., process 100). An action is then caused 440 in the laboratory experiment automation system (see, e.g., causing 160 of process 100). If there are more 450 contexts for which actions are needed, then the system returns to receive 420 more contexts and otherwise ceases 460. In such embodiments, the laboratory experiment automation computer-based reasoning models may be used to control what actions are taken by laboratory experiment control equipment. These actions, in some embodiments, may be passed up a control hierarchy and an action to take chosen by the higher levels in the control hierarchy as described herein.

Control of Energy Transfer Systems

The process 100 and/or 400 may also be applied in the context of control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, process 100 may receive 110 a context for the operation of an energy transfer system and determine 120 and 130 candidate actions based on each of two or more energy transfer computer-based reasoning models. For each one or more candidate actions, surprisal may be determined 140. This may be accomplished, in some embodiments, by determining a first and second PDMF for each and determining surprisal based on the first and second PDMF. A determination may be made whether to select or choose 150 an action for the energy transfer system to take based at least in part on the determined surprisals. An action may be caused 160 based at least in part on the chosen action, and the process may return to receive 110 more contexts. In some embodiments, the chosen labels may be passed up a control hierarchy and the process 100 may be repeated.

In some embodiments, energy transfer control may be accomplished by process 400. Process 400 proceeds by receiving 410 two or more energy transfer computer-based reasoning models. The process proceeds by receiving 420 a context for which an energy transfer control action is needed. The energy transfer computer-based reasoning models are then used to determine 430 an action to take using an energy transfer control system (using, e.g., process 100). An action is then caused 440 in the energy transfer system (see, e.g., causing 160 of process 100). If there are more 450 contexts for which actions are needed, then the system returns to receive 420 more contexts and otherwise ceases 460. In such embodiments, the energy transfer computer-based reasoning models may be used to control what actions are taken by energy transfer control equipment. These actions, in some embodiments, may be passed up a control hierarchy and an action to take chosen by the higher levels in the control hierarchy as described herein.

System Overview

FIG. 2 depicts a block diagram of a system for selecting among computer-based reasoning models. System 200 includes a number of elements connected by a communicative coupling or network 290. Examples of communicative coupling and networks are described elsewhere herein. In some embodiments, the process 100 of FIG. 1 and/or process 400 of FIG. 4 may run on the system 200 of FIG. 2 and/or the hardware 300 of FIG. 3. For example, the receiving 110 and determining 120-140, choosing 150 of FIG. 1 may be handled at analysis system 210. The resultant set(s) of data elements might be stored in communicatively coupled storage 230 or 240. The control system 220 may cause performance 160 of actions for one or more physical systems 250-258.

Each of analysis system 210 and control system 220 may run on a single computing device, multiple computing devices, in a distributed manner across a network, on one or more virtual machines, which themselves run on one or more computing devices. In some embodiments, analysis system 210 and control system 220 are distinct sets of processes running on distinct sets of computing devices. In other embodiments, analysis system 210 and control system 220 are intertwined or share processes or functions and/or run on the same computing devices. In some embodiments, storage 230 and 240 are communicatively coupled to analysis system 210 and control system 220 via a network 290 or other connection. Storage 230 and 240 may also be part of or integrated with analysis system 210 and/or control system 220 via a network 290 or other connection.

As discussed herein the various aspects or embodiments of processes 100 and 400 may run in parallel, in conjunction, together, or one process may be a subprocess of another. Further, any of the processes may run on the systems or hardware discussed herein.

Example Control Hierarchies

In some embodiments, the technique herein may use a control hierarchy to control systems and/or cause actions to be taken (e.g., as part of causing 160 performance in FIG. 1). There are numerous example control hierarchies and many types of systems to control, and hierarchy for vehicle control is presented below. In some embodiments, only a portion of this control hierarchy is used. It is also possible to add levels to (or remove levels from) the control hierarchy.

An example control hierarchy for controlling a vehicle could be:
  Primitive Layer—Active vehicle abilities (accelerate, decelerate), lateral, elevation, and orientation movements to control basic vehicle navigation
  Behavior Layer—Programmed vehicle behaviors which prioritize received actions and directives and prioritize the behaviors in the action.
  Unit Layer—Receives orders from command layer, issues moves/directives to the behavior layer.
  Command Layers (hierarchical)—Receives orders and gives orders to elements under its command, which may be another command layer or unit layer.

Example Data Elements, Contexts, and Operational Situations

In some embodiments, the data elements may include context data and action data in context-action pairs. Further, data elements may relate to control of a vehicle. For example, context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the locale in which the vehicle is operating. The locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, NC and another may be driving in Pittsburgh, PA. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action may include vehicle maintenance information. The context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined and later used for predictions and messaging.

Causing performance of an identified action can include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Overview of Information Gain

Information gain can be computed as a rate based on new training data that is being put into the computer-based reasoning model. As the model becomes more trained in the domain, the information gain of new training data is expected to drop, and each new piece of training data will yield less. However, an increased rate of information gain means that the model is learning new things; a significant or sustained high rate of information gain may be used to trigger a model optimization to remove data that may now be less informative.

In some embodiments, as described elsewhere herein, relative surprisal is calculated using $\log_2 (P/Q)$, where P is the posterior probability of an event occurring after it has occurred divided by the prior probability, Q, of that same event occurring before it has occurred.

In some embodiments, different measures that are correlated with, related to, or share similar characteristics of information entropy may be used. Although the accuracy, performance, precision, domains, and ranges may be applicable or invalid in different circumstances, other functions may include variance, Gini coefficient, mean absolute difference, median absolute deviation, variance-to-mean ratio, other dispersion methods, and other techniques for finding differences between probability density or probability mass functions.

In some embodiments, the surprisal is calculated from the probability density or mass functions (PDMFs) on the hypervolumes of the contexts represented by the multidimensional space of the set of data elements and performing analytical or numerical methods of Bayesian inferences using the PDMFs. Further, the embodiments may use appropriate PDMF estimation techniques on the data elements, such as multivariate normal, gaussian, Laplace, maximal entropy, other parametric or nonparametric distributions, or different kernel density estimation or approximation techniques for each data element or subset of data elements in the set of data elements before the data element or data elements are added (Q) and then again after they are added (P).

In some embodiments, the surprisal of a data element with respect to a set of data elements can be calculated based on the probability that each element will be within the kth nearest (or "closest") elements to a given point, where the probability of being among the kth nearest elements is calculated using a set of distance measures on a generalized spanning tree that represents the topology of the set of data elements based on their k nearest neighbors. The surprisal of a data element with respect to a set of data elements may be calculated using three probability density or mass functions. For example, consider the three PDMFs (in this case probability mass functions):

$P(i)$=DistContrib(particular data element $i$)/ΣDistContrib(each particular data element in the set of data elements)

$Q_{known}(i)$=DistContrib(particular data element $i$)/ΣDistContrib(each particular data element in the set of data elements & expected value of elements previously unknown), $$Q_{unknown}(i) = \text{Average}(\text{DistContrib}(\text{each data element in the set of data elements}))/\Sigma \text{DistContrib}(\text{each particular data element \& set of data elements}),$$

and if each data element is weighted identically, $Q_{unknown}$ may be 1/N, where N is the number of data elements. $Q_{known}$ refers to data elements that were known prior to their inclusion in P, and $Q_{known}$ refers to the data elements that were unknown and assumed as expectation prior to their inclusion in P. The shorthand (or function) DistContrib(X) may be a measure, premetric, or other function of the nearest neighbors to X. An example calculation is:

$$\text{DistContrib}(X) = \Sigma C_i \text{ Distance}(\text{nearest neighbors}),$$
where $C_i$ is a coefficient and nearest_neighbor,
is the $i^{th}$ nearest neighbor of data element $X$,
and $i=1 \ldots N$ for a DistContrib calculation of
the $N$ nearest neighbors.

The nearest neighbors and the distance calculation may be determined using any appropriate distance measurement or other premetric, including Shannon Entropy, Renyi entropy, Hartley entropy, min entropy, Collision entropy, Renyi divergence, diversity index, Simpson index, Gini coefficient, Kullback-Leibler divergence, Fisher information, Jensen-Shannon divergence, Symmetrised divergence, 1-Kronecker delta, Euclidean distance, Minkowski distance, Damerau—Levenshtein distance, and/or any other distance measure, metric, psuedometric, premetric, index, or the like. The list of coefficients may be any appropriate list, such as a decreasing series including the harmonic series (1/i) and other series like (1/(i+1)), (N−i+1), ($N^2-i^2+1$), ($1/i^2$), etc., a constant number (e.g., $C_i=1$), an increasing series (e.g., $C_i=i$), or a non-monotonic series (e.g., $C_i=\sin(i*pi/7)$).

The techniques discussed herein, in some embodiments, can be used to compare two or more models or parts of two or more models. This comparison can be useful for summarizing differences between the models and for determining whether models are good candidates for combining and/or using evolutionary programming techniques. Further, the techniques herein are useful to case-based reasoning systems (one type of computer-based reasoning), but are also useful for data and model reduction for machine learning and artificial intelligence systems (also types of computer-based reasoning systems). For those system, training data can become excessive, and training and retraining the neural network can be time and computationally intensive. Reducing the size of the training sets can be beneficial for reducing training data (among other benefits) while minimizing the loss of information in the training.

Overview of Surprisal, Entropy, and Divergence

Below is a brief summary of some concepts discussed herein. It will be appreciated that there are numerous ways to compute the concepts below, and that other, similar mathematical concepts can be used with the techniques discussed herein.

Entropy ("H(x)") is a measure of the average expected value of information from an event and is often calculated as the sum over observations of the probability of each observation multiple by the negative log of the probability of the observation.

$$H(x) = -\Sigma_i p(x_i) * \log p(x_i)$$

Entropy is generally considered a measure of disorder. Therefore, higher values of entropy represent less regularly ordered information, with random noise having high entropy, and lower values of entropy represent more ordered information, with a long sequence of zeros having low entropy. If $\log_2$ is used, then entropy may be seen as representing the theoretical lower bound on the number of bits needed to represent the information in a set of observations. Entropy can also be seen as how much a new observation distorts the combined PDMF of the observed space. Consider, for example, a universe of observations where there is a certain probability that each of A, B, or C occurs, and a probability that something other than A, B, or C occurs.

Surprisal ("I(x)") is a measure of how much information is provided by a new event $x_i$.

$$I(x_i) = -\log p(x_i)$$

Surprisal is generally a measure of surprise (or new information) generated by an event. The smaller the probability of $X_i$, the higher the surprisal.

Kullback-Leibler Divergence ("KL divergence" or "$\text{Div}_{KL}(x)$") is a measure of difference in information between two sets of observation. It is often represented as $$\text{Div}_{KL}(x) = \Sigma_i p(x_i) * (\log p(x_i) - \log q(x_i)), \text{ where}$$
$p(x_i)$ is the probability of $x_i$ after $x_i$ has
occurred, and $q(x_i)$ is the probability of $x_i$
before $x_i$ has occurred.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
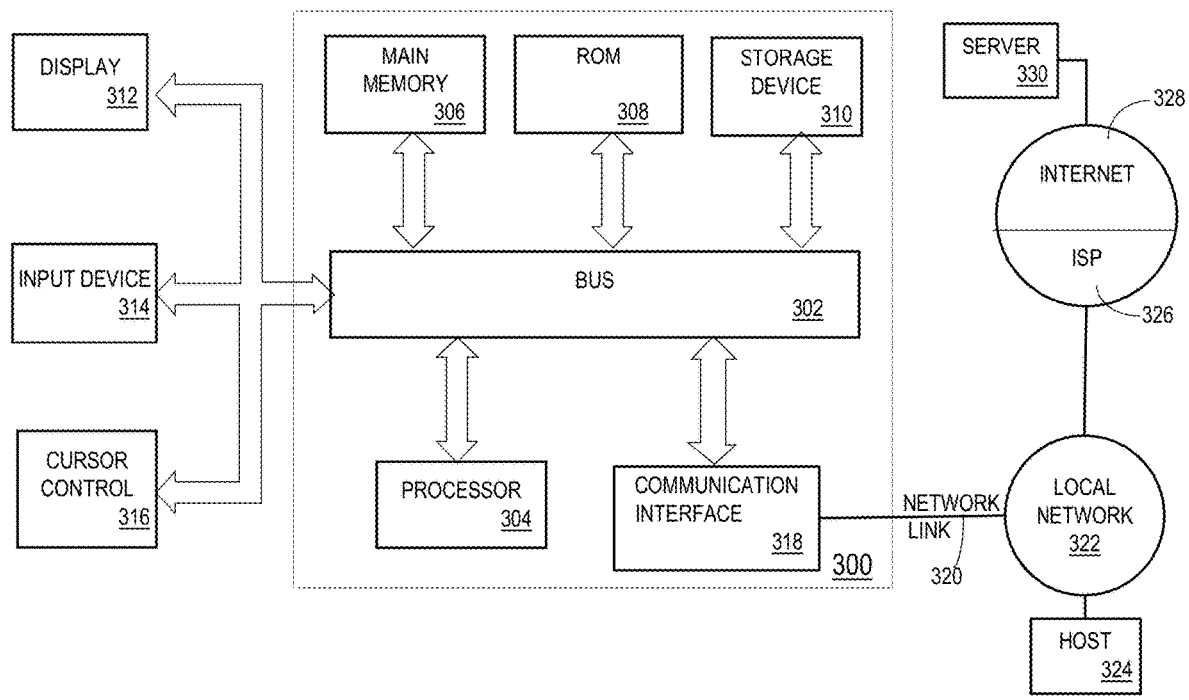
FIG. 3 depicts example hardware for improved automated selection in computer-based reasoning systems.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, by one or more computing devices, context data for operation of a controlled system;
   determining, by the one or more computing devices, one or more first candidate actions to take based on context data and a first computer-based reasoning model and first surprisal associated with the one or more first candidate actions;
   determining, by the one or more computing devices, second one or more candidate actions to take based on the context data and a second computer-based reasoning model and second surprisal associated with the second one or more candidate actions, wherein the first computer-based reasoning model and the second computer-based reasoning model are distinct;

comparing, by the one or more computing devices, the first surprisal associated with the first one or more candidate actions and the second surprisal associated with the second one or more candidate actions to determine whether the first one or more candidate actions or the second surprisal associated with the second one or more candidate actions is least surprising;

choosing, by the one or more computing devices, to use either the first one or more candidate actions or the second one or more candidate actions as chosen one or more actions based at least in part on which of the first one or more candidate actions and the second surprisal associated with the second one or more candidate actions is least surprising; and causing, by the one or more computing devices, performance of an action in the controlled system based at least in part on the chosen one or more actions, wherein the controlled system is selected from the group consisting of a controlled self-driving vehicle, a controlled image labelling system, a controlled manufacturing system, a controlled smart voice control system, a controlled federated device system, a controlled automation of experiment system, and a controlled energy transfer system.

2. The method of claim 1, wherein causing performance of the action in the controlled system based at least in part on the chosen one or more actions comprises causing performance of the action by a control system in the controlled system.

3. The method of claim 1, wherein causing performance of the action in the controlled system based at least in part on the chosen one or more actions comprises:
passing the chosen one or more actions up a control hierarchy and a next level up a control hierarchy;
determining whether to perform the chosen one or more actions based at least in part on the chosen one or more actions and other candidate actions; and
causing performance of the action chosen at that level in the control hierarchy.

4. The method of claim 1, wherein the first computer-based reasoning model is a case-based reasoning model and determining the first one or more candidate actions comprises:
determining a context-action pair with a closest context in the case-based reasoning model to the context data; and
selecting an action associated with the context-action pair with the closest context as one of the first one or more candidate actions.

5. The method of claim 1, further comprising:
determining first confidence in the first one or more candidate actions based on the first surprisal; and
in response to determining that the first one or more candidate actions is less surprising than the second one or more candidate actions, providing to the controlled system, an indication of the first confidence.

6. The method of claim 1, further comprising:
determining whether surprisal of the chosen one or more actions is outside a certain threshold; and
based on determining that the surprisal of the chosen one or more actions is outside the certain threshold, sending the controlled system a message flagging the chosen one or more actions as being associated with low confidence.

7. The method of claim 1, wherein determining the first surprisal of the one or more first candidate actions comprises:
determining a first PDMF for a set of data elements that does not include particular context data associated with the first one or more candidate actions, wherein the set of data elements is associated with the first computer-based reasoning model;
determining a second PDMF for the set of data elements including the particular context data associated with the first one or more candidate actions; and
determining the first surprisal of the first one or more candidate actions based on a ratio of the first PDMF and the second PDMF.

8. The method of claim 7, further comprising determining the second PDMF using numerical methods of Bayesian inference.

9. The method of claim 7, further comprising determining the second PDMF using a multivariate Laplace distribution, a multivariate Gaussian distribution, or a radial basis function.

10. The method of claim 7, further comprising:
determining the second PDMF based at least in part on individual PDMFs for the particular context data associated with the one or more first candidate actions and each data element in the set of data elements.

11. The method of claim 7, further comprising:
determining multiple nearest data elements from the set of data elements for the particular context data associated with the first one or more candidate actions;
determining multiple premetric contributions, one for each of the multiple nearest data elements;
determining a premetric measurement of the particular context data associated with the first one or more candidate actions based at least in part on the multiple premetric contributions;
determining new premetric measurements for at least one data element in the set of data elements, wherein each new premetric measurement for the at least one data element is computed based on premetric to the particular context data associated with the one or more first candidate actions; and
determining the second PDMF based at least in part on the premetric measure for the particular context data associated with the first one or more candidate actions and the new premetric measurements.

12. The method of claim 11, wherein:
the first PDMF is computed based on an average premetric contribution of each data element in the set of data elements divided by a sum of premetric contributions of each data element in the set of data elements;
and further comprising:
determining the second PDMF based on the premetric measurement of the particular context data associated with the one or more first candidate actions divided by a sum of the new premetric measurements.

13. The method of claim 1, further comprising:
determining the first computer-based reasoning model by selecting elements from a larger computer-based reasoning model based on first criteria; and
determining the second computer-based reasoning model by selecting data elements from the larger computer-based reasoning model based on second criteria.

14. The method of claim 1, further comprising:
based on the comparison of the first surprisal and the second surprisal and determining that the second one or more candidate actions is less surprising than the first one or more candidate actions, choosing as the chosen one or more actions the second one or more candidate actions.

15. The method of claim 1, further comprising:
based on the comparison of the first surprisal and the second surprisal, determining the chosen one or more actions based at least in part on the first surprisal and the second surprisal and one or more other factors.

16. The method of claim 1, further comprising:
determining the first surprisal associated with the first one or more candidate actions based at least in part surprisal of the first one or more candidate actions relative to one or more other candidate actions, including the second one or more candidate actions.

17. The method of claim 1, further comprising:
determining the first surprisal associated with the first one or more candidate actions based at least in part the first surprisal of the first one or more candidate actions relative to the first computer-based reasoning model.

18. A system for performing a machine-executed operation involving instructions, wherein said instructions are instructions which, when executed by one or more computing devices, cause performance of a process comprising:
receiving context data for operation of a controlled system;
determining one or more first candidate actions to take based on context data and a first computer-based reasoning model and first surprisal associated with the one or more first candidate actions;
determining second one or more candidate actions to take based on the context data and a second computer-based reasoning model and second surprisal associated with the second one or more candidate actions, wherein the first computer-based reasoning model and the second computer-based reasoning model are distinct;
comparing the first surprisal associated with the first one or more candidate actions and the second surprisal associated with the second one or more candidate actions to determine whether the first one or more candidate actions or the second surprisal associated with the second one or more candidate actions is least surprising;
choosing to use the first one or more candidate actions or the second one or more candidate actions as chosen one or more actions based at least in part which of the first one or more candidate actions and the second surprisal associated with the second one or more candidate actions is least surprising; and
causing performance of an action in the controlled system based at least in part on the chosen one or more actions, wherein the controlled system is selected from the group consisting of a controlled self-driving vehicle, a controlled image labelling system, a controlled manufacturing system, a controlled smart voice control system, a controlled federated device system, a controlled automation of experiment system, and a controlled energy transfer system.

19. A non-transitory computer readable medium storing instructions which, when executed by one or more computing devices, cause the one or more computing devices to perform a process of:
receiving context data for operation of a controlled system;
determining one or more first candidate actions to take based on context data and a first computer-based reasoning model and first surprisal associated with the one or more first candidate actions;
determining second one or more candidate actions to take based on the context data and a second computer-based reasoning model and second surprisal associated with the second one or more candidate actions, wherein the first computer-based reasoning model and the second computer-based reasoning model are distinct;
comparing the first surprisal associated with the first one or more candidate actions and the second surprisal associated with the second one or more candidate actions to determine whether the first one or more candidate actions or the second surprisal associated with the second one or more candidate actions is least surprising;
choosing to use the first one or more candidate actions or the second one or more candidate actions as chosen one or more actions based at least in part on which of the first one or more candidate actions and the second surprisal associated with the second one or more candidate actions is least surprising; and
causing performance of an action in the controlled system based at least in part on the chosen one or more actions, wherein the controlled system is selected from the group consisting of a controlled self-driving vehicle, a controlled image labelling system, a controlled manufacturing system, a controlled smart voice control system, a controlled federated device system, a controlled automation of experiment system, and a controlled energy transfer system.

* * * * *